US008170135B2

(12) United States Patent
Hanna et al.

(10) Patent No.: US 8,170,135 B2
(45) Date of Patent: May 1, 2012

(54) METHODS AND APPARATUS FOR EMITTER DETECTION (75) Inventors: Craig A. Hanna, Vestal, NY (US); Anthony J. Gounalis, Endicott, NY (US); Robert Haefner, Apalachin, NY (US)

(73) Assignee: Lockheed Martin Corporation, Bethesda, MD (US)

(*) Notice: Subject to any disclaimer, the term of this patent is extended or adjusted under 35 U.S.C. 154(b) by 975 days.

(21) Appl. No.: 11/714,717

(22) Filed: Mar. 6, 2007

(65) Prior Publication Data
US 2008/0219322 A1 Sep. 11, 2008

(51) Int. Cl.
H04L 27/00 (2006.01)
G01S 7/36 (2006.01)
G01S 7/42 (2006.01)
H04K 3/00 (2006.01)

(52) U.S. Cl. ............ 375/295; 342/13; 342/89; 342/159; 342/91; 342/98; 342/20; 342/175; 342/195; 342/165; 342/169; 342/14; 342/90; 342/99; 342/15

(58) Field of Classification Search .................. None
See application file for complete search history.

(56) References Cited

U.S. PATENT DOCUMENTS

| 4,695,790 | A | | 9/1987 | Mathis |
| 5,914,687 | A | | 6/1999 | Rose |
| 5,999,129 | A | | 12/1999 | Rose |
| 6,072,994 | A | | 6/2000 | Phillipps et al. |
| 6,100,845 | A | * | 8/2000 | Rose .............................. 342/417 |
| RE36,944 | E | | 11/2000 | Li |
| 6,166,729 | A | * | 12/2000 | Acosta et al. .................. 715/719 |
| 6,211,810 | B1 | * | 4/2001 | Schirf .............................. 342/36 |
| 6,411,249 | B1 | | 6/2002 | Rose |
| 6,545,632 | B1 | * | 4/2003 | Lyons et al. .................... 342/45 |
| 6,727,840 | B1 | | 4/2004 | Sullivan |
| 6,839,025 | B1 | | 1/2005 | Reigle |

(Continued)

FOREIGN PATENT DOCUMENTS

WO        WO 95/19543 A1        7/1995

(Continued)

OTHER PUBLICATIONS

Applied Signal Technology, Inc., 2006 Corporate Capabilities Summary, www.appsig.com.

(Continued)

Primary Examiner — Shuwang Liu
Assistant Examiner — Gina McKie
(74) Attorney, Agent, or Firm — Wolf, Greenfield & Sacks, P.C.

(57) ABSTRACT

A method is provided for coordinating detection of emitted signals by a receiver with transmission of signals by a transmitter, wherein the receiver and the transmitter are located on the same platform. The receiver scans a surrounding environment to detect emitted signals in multiple frequency ranges while the transmitter transmits signals in a predetermined frequency range. The receiver may employ dwells which may be defined as receiver configurations. A dwell, when executed, may be used to detect signals in a certain frequency range. If a frequency range of the dwell conflicts with the frequency range of transmitter signals, which may result in interference of transmitter signals with detection of emitted signals, execution of the dwell may be delayed. If the frequency range of the dwell is such that transmitter signals do not interfere with execution of the dwell, the dwell can be executed.

18 Claims, 7 Drawing Sheets

U.S. PATENT DOCUMENTS

| | | | |
|---|---|---|---|
| 6,894,634 B2* | 5/2005 | Gounalis | 342/13 |
| 6,985,102 B1 | 1/2006 | Horn et al. | |
| 7,808,421 B2* | 10/2010 | Kunz et al. | 342/13 |
| 8,046,354 B2* | 10/2011 | Day et al. | 707/720 |
| 2003/0109271 A1 | 6/2003 | Lewis et al. | |
| 2004/0219919 A1* | 11/2004 | Whinnett et al. | 455/442 |
| 2005/0052311 A1 | 3/2005 | Gounalis | |
| 2005/0052312 A1 | 3/2005 | Bricker et al. | |
| 2005/0227637 A1 | 10/2005 | Nendick | |
| 2006/0018292 A1 | 1/2006 | Wiatrowski et al. | |
| 2006/0097904 A1 | 5/2006 | Gounalis | |
| 2006/0132348 A1* | 6/2006 | Valand | 342/13 |
| 2007/0090988 A1* | 4/2007 | Beharrell | 342/13 |
| 2008/0180309 A1* | 7/2008 | Kunz et al. | 342/13 |

FOREIGN PATENT DOCUMENTS

| | | |
|---|---|---|
| WO | WO 2004/088454 A2 | 10/2004 |
| WO | WO 2005/124580 A | 12/2005 |

OTHER PUBLICATIONS

J.R. Wilson, "Fast Trace for a New Navy Warplane", American Institute of Aeronautics and Astronautics, Aerospace American, May 2005, pp. 26-30.

* cited by examiner

METHODS AND APPARATUS FOR EMITTER DETECTION

GOVERNMENT SUPPORT

This invention was made with government support under contract number N00019-05-C-0076 awarded by the Department of the Navy. The government may have certain rights in the invention.

FIELD OF INVENTION

The present invention relates to using a receiver to detecting emitted signals.

DISCUSSION OF RELATED ART

Electronic Support Measure (ESM) receivers are receivers used to detect, identify, and/or locate emitted electromagnetic signals. Such signals may have vastly different signal characteristics (e.g., pulse width and pulse repetition interval) and may be transmitted by a variety of emitters that transmit in different portions of the frequency spectrum.

Thus, it may be desired to use an ESM receiver to detect signals across a wide range of frequencies. This may be accomplished using a set of dwells which define a duration of scanning within a certain frequency range. A dwell may have an associated revisit time that defines how often the dwell is executed and may also have defined a duration.

SUMMARY OF INVENTION

One embodiment is directed to a method for coordinating detection of emitted signals with transmission of signals in a device having at least one transmitter that transmits signals in a first frequency range and at least one receiver system adapted to execute a plurality of dwells. The method comprises acts of: determining a first time at which at least one signal in the first frequency range is scheduled for transmission by the at least one transmitter; selecting a first dwell from the plurality of dwells to be executed at the first time; determining whether a frequency range of the first dwell conflicts with the first frequency range; and when it is determined that the frequency range of the first dwell conflicts with the first frequency range, delaying execution of the first dwell. Another embodiment is directed to at least one computer readable medium, encoded with instructions, that when executed, perform the above-described method.

A further embodiment is directed to at least one receiver system adapted to execute a plurality of dwells and configurable to operate with at least one transmitter that transmits signals in a first frequency range. The receiver system comprising: at least one controller that: determines a first time at which at least one signal in the first frequency range is scheduled for transmission by the at least one transmitter; selects a first dwell from the plurality of dwells to be executed at the first time; determines whether a frequency range of the first dwell conflicts with the first frequency range; and when it is determined that the frequency range of the first dwell conflicts with the first frequency range, delays execution of the first dwell.

DETAILED DESCRIPTION

In some embodiments, a platform that includes an ESM receiver may also include a transmitter. Thus, the platform may simultaneously transmit signals via a data link and detect signals emitted by various emitters. Applicants have appreciated that, in some situations, signals transmitted by the transmitter may interfere with detection of signals by the receiver.

Figure 1:
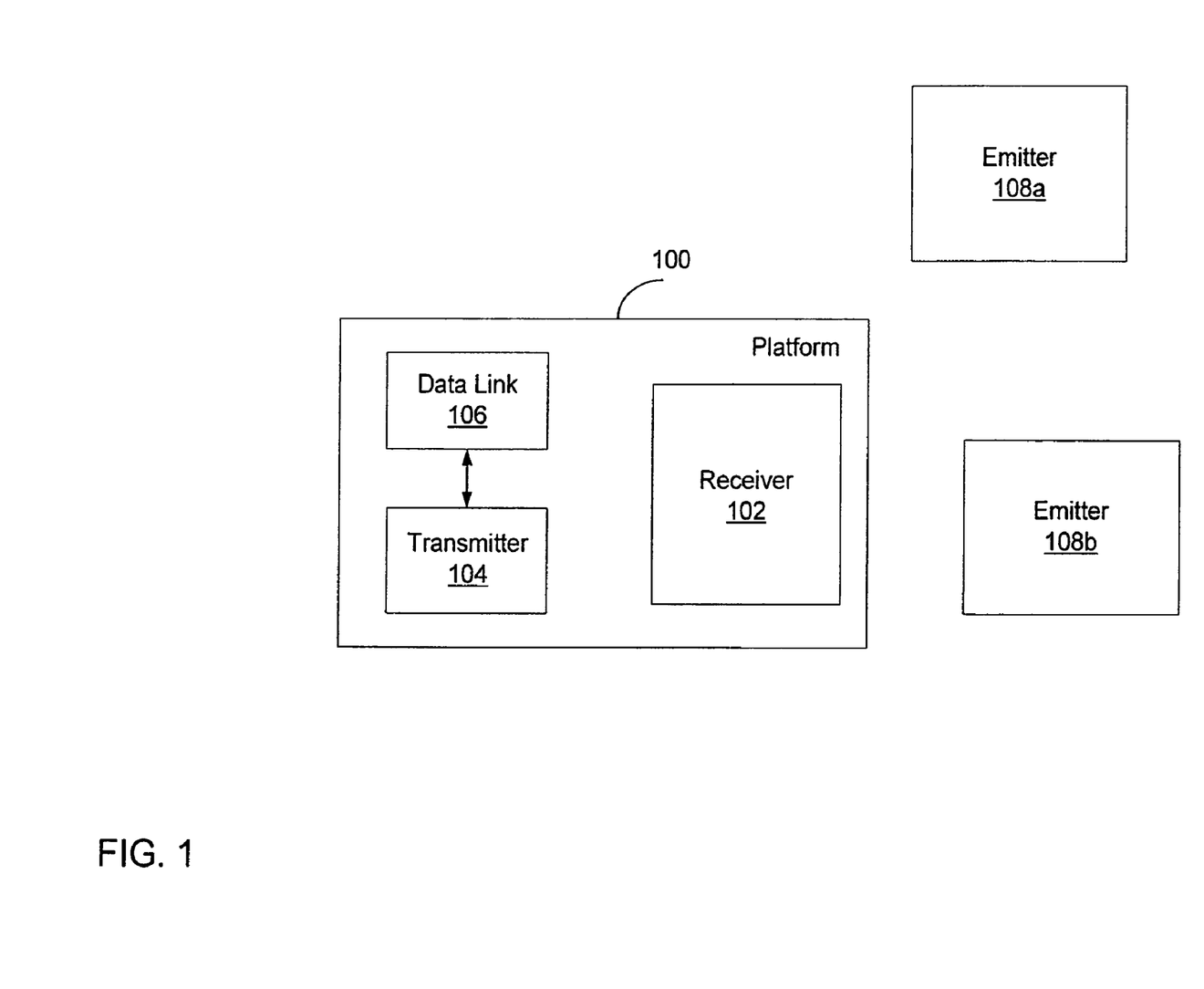
FIG. 1 is a block diagram illustrating a platform including a transmitter and a receiver, on which some embodiments of the invention may be implemented.

FIG. 1 is a diagram of an illustrative platform 100 in which some embodiments may be implemented. Platform 100 includes a receiver 102 which is any suitable type of receiver, such as, for example, an ESM receiver. Platform 100 may also include a transmitter 104, which may be used by platform 100 for any suitable purpose, such as, for example, to exchange tactical information with other platforms and/or other entities. The transmitter 104 may use a data link 106 to transmit signals. Data link 106 may be any suitable type of data link. For example, in some embodiments, data link 106 may be a time division multiple access (TDMA) protocol data link. In embodiments in which the data link is a TDMA data link, operation of data link 106 may be divided into a predefined number of slots. That is, in TDMA systems, a plurality of transmitters transmit in the same frequency range. So that transmissions from different transmitters do not interfere, each transmitter may be allocated time slots in which it is permitted to transmit. Data link 106 may control the time slots in which the on-board transmitter may transmit. The platform 100 may be allocated a particular frequency range and data link 106 may transmit electromagnetic signals within this frequency range.

Concurrently with transmitting signals over data link 106, platform 100 may scan a surrounding environment using the receiver 102 which may collect electromagnetic signals (e.g., signals emitted by emitters 108a and 108b in FIG. 1). Receiver 102 may scan the environment (e.g., using a scan strategy or in any other suitable way) to detect signals of various frequency ranges. In some embodiments, to detect signals of different frequency having different signal characteristics, receiver 102 may execute a series of dwells, which is a series of configurations of the receiver allowing it to tune to different frequencies and detect signals having different frequency characteristics.

If receiver 102 is tuned to a frequency which is affected by a data link transmission, the transmission may interfere with the receiver's detection of emitter signals, as described in greater detail below. To resolve this, the receiver may be "blanked" at a frequency band (or range) concurrent with data link transmission, which means that the receiver disregards signals detected during the data link transmission. Blanking may be accomplished using any suitable method. This approach works well if a data link operates at a low duty cycle, e.g., if the data link transmits signals approximately 1-2% of its operating time. However, in case of high duty cycles (e.g., the data link transmits 25-30% of its operating time), blanking the receiver may compromise timely detection of emitters. Another way to resolve the conflict between data link transmission and signal detection is to suppress transmission by the data link whenever the data link attempts to transmit signals in a frequency band interfering with the frequency to which the receiver is tuned. The data link is considered suppressed when it is precluded from transmitting signals, which may be accomplished using any suitable method. However, this may lead to a degradation in performance of the data link because some of the signals, if suppressed, will not reach their intended recipient(s), which may cause undesirable consequences.

According to yet another approach, execution of dwells by the receiver in a frequency range that is in or near a frequency range of the data link transmission may be delayed until a gap in the data link transmission occurs. Therefore, at a given time, either the receiver detects emitter signals or the data link transmits signals. Consequently, the receiver may be idle, potentially for a long time, until a gap in the data link transmission occurs. This may decrease a performance of the receiver, and may result in failure to timely detect some of the emitters in the surrounding environment.

Thus, in some embodiments of the invention, when receiver 102 is configured to detect signals in a frequency range that overlaps or is near the frequency at which the data link transmits, detection of these signals may be delayed and the receiver may be configured to detect signals in a non-conflicting frequency range during the data link transmission. This may be done in any suitable way, as the invention is not limited in this respect. In some embodiments, an advanced slot notification (ASN) signal may be provided by data link 106 to receiver 102 to notify the receiver in advance that a particular data link is scheduled to transmit at a particular time. In response, receiver 102 may determine whether the transmission would interfere with detection, and, if so, may tune to a frequency range not conflicting with the frequency range of signals transmitted by data link 106.

Figure 2A:
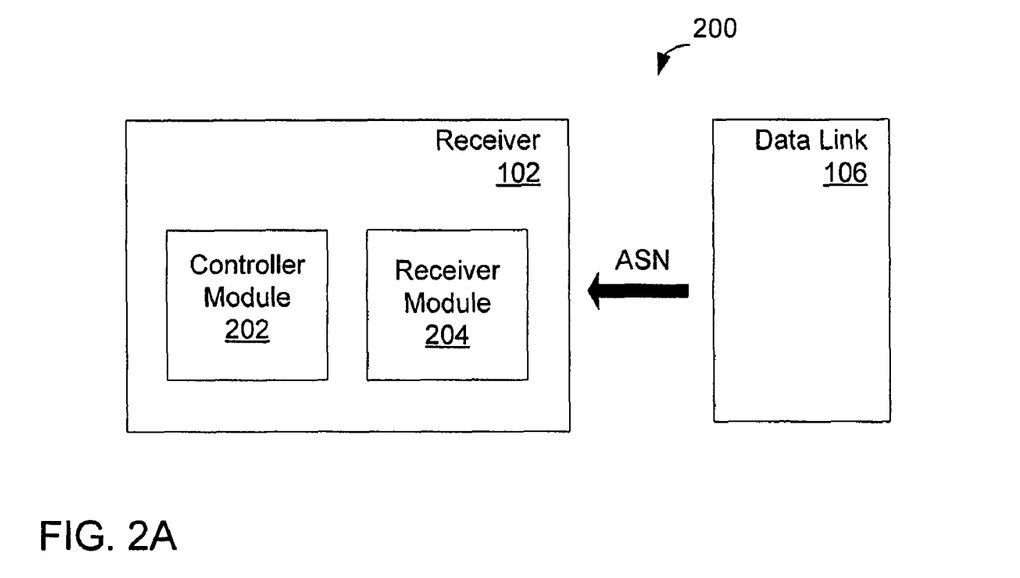
FIG. 2A is a block diagram of an ESM receiver that receives an advanced slot notification signal from a data link, in accordance with some embodiments of the invention.

FIG. 2A is a block diagram illustrating a system 200 wherein data link 106 may provide the ASN signal to receiver 102, in accordance with some embodiments. Receiver 102 may include a receiver module 204 comprising a processing core of receiver 102 and a controller module 206 controlling receiver module 204.

Figure 2B:
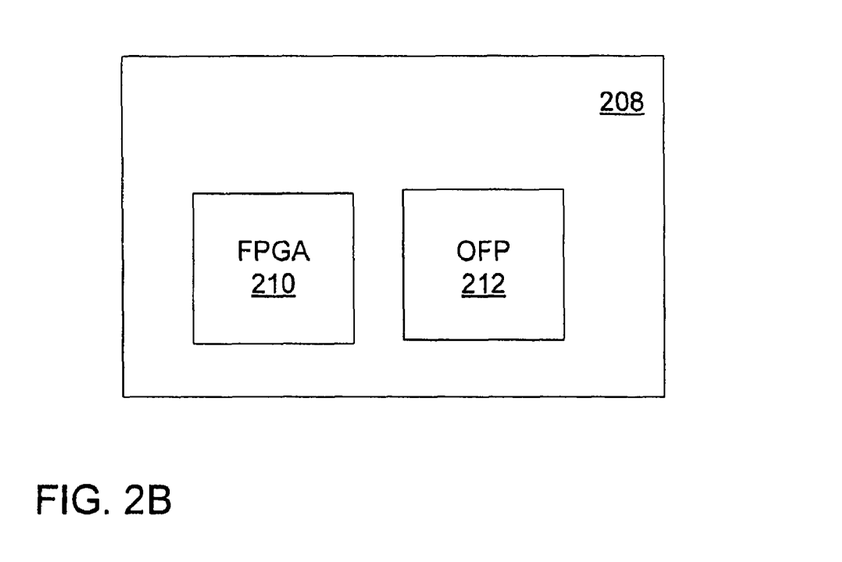
FIG. 2B is a block diagram of an illustrative system, on which some embodiments of the invention may be implemented.

In some embodiments of the invention, a system 208 shown in FIG. 2B may be used. System 208 may be any suitable system, such as, for example, a single board computer (SBC) (e.g., a SBC located on an airborne platform, such as, for example, a helicopter or located in any other suitable location). System 208 may manage detection of emitter signals and perform signal processing. System 208 may include a field programmable gate array (FPGA) 210, an operating flight program (OFP) 212 and/or any other suitable components. System 208 may be included in or associated with either or both receiver module 204 and controller module 206. FPGA 210 may include a logic implementing some embodiments of the invention, with components implementing of the logic readable and writeable by SBC 208. OFP 212 may control the operation of FPGA 210. It should be appreciated that system 208 and its components are given and their operation is discussed hereinbelow by way of example only and not to limit the scope of the invention. It should also be appreciated that any other suitable devices, systems, programs and applications may be used to implement embodiments of the present invention.

Figure 3A:
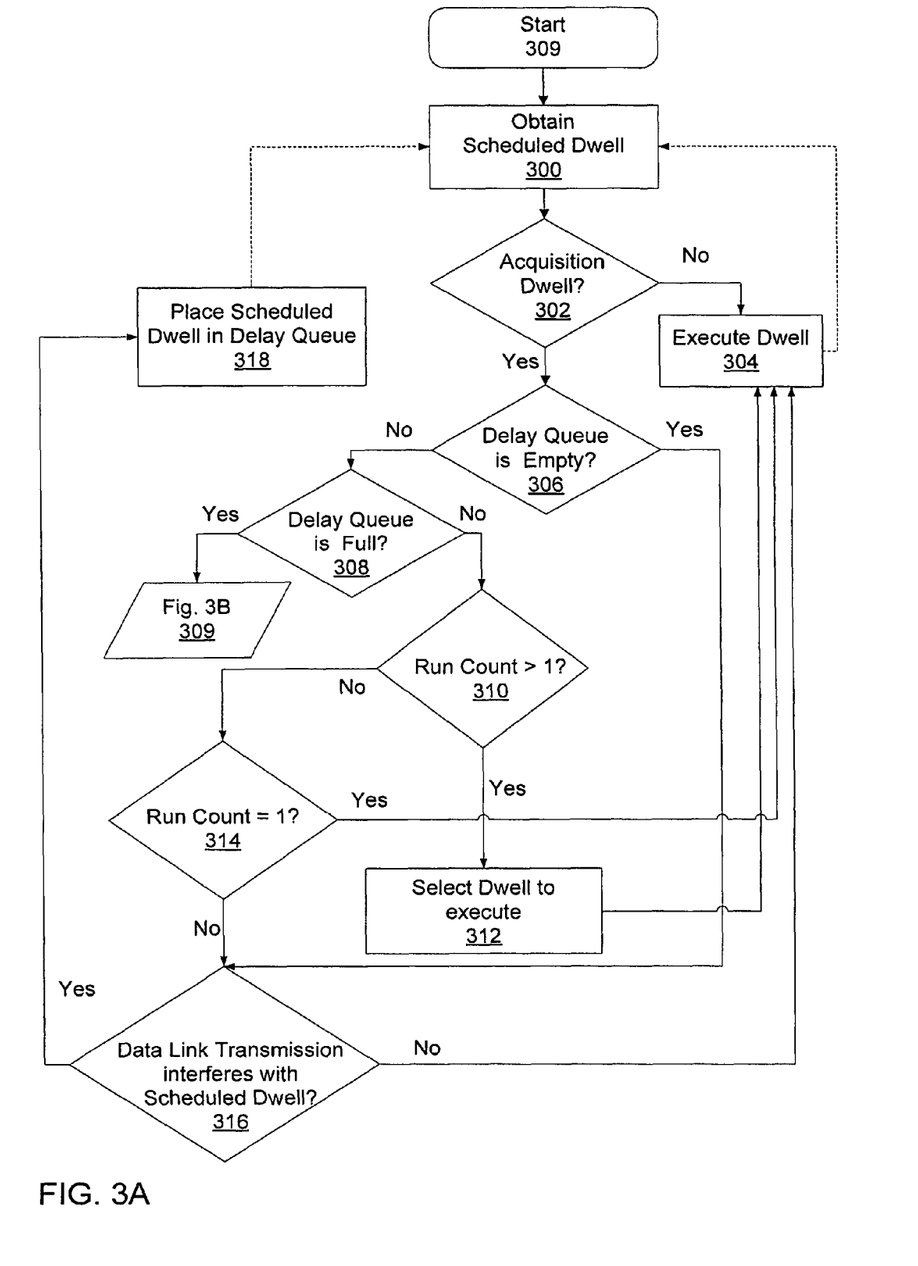
FIGS. 3A and 3B are flowcharts illustrating a process of harmonizing an execution of receiver dwells with a data link transmission, in accordance with some embodiments.
Figure 3B:
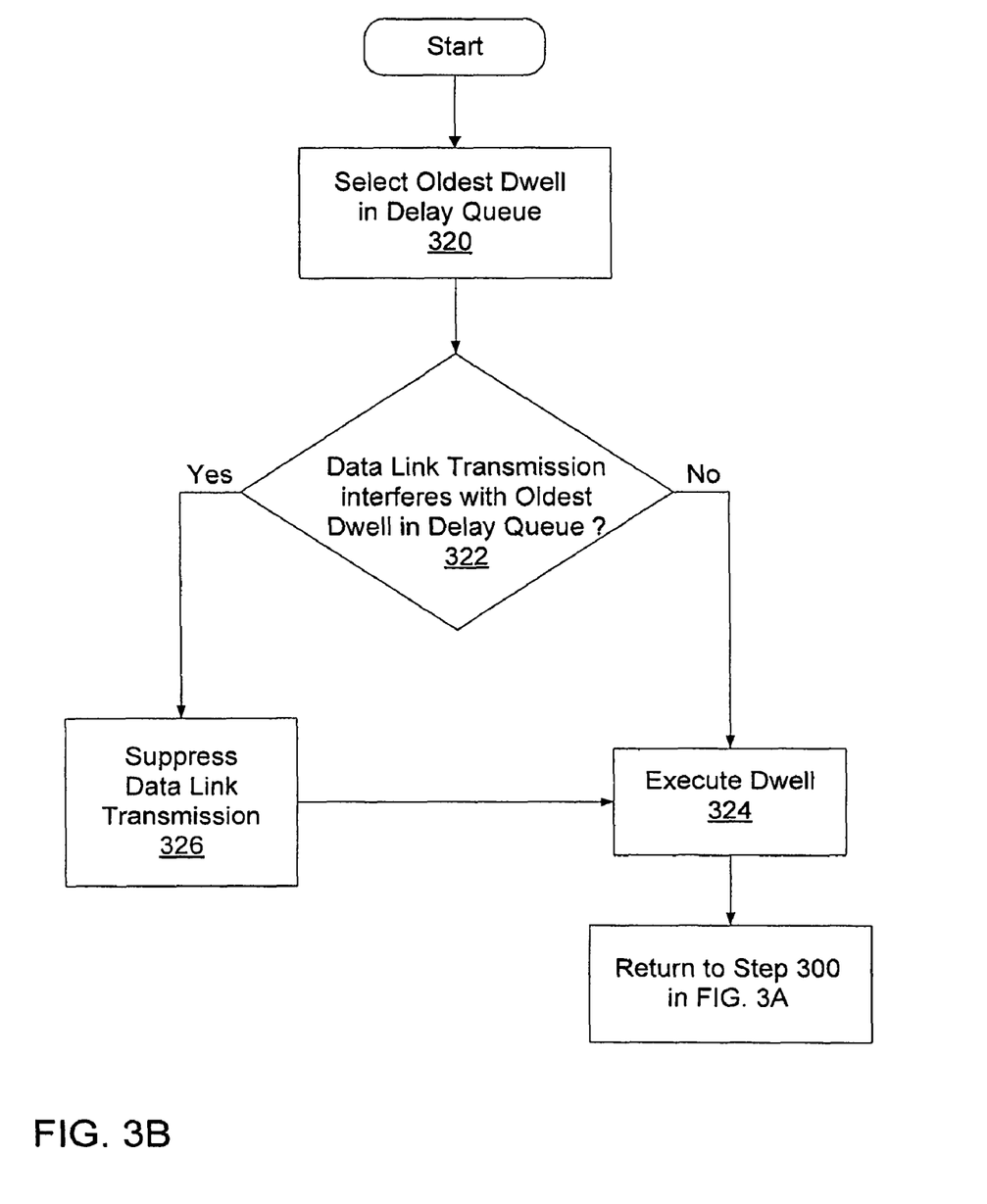

FIGS. 3A and 3B illustrate an example of a process for harmonizing detection of signals by an ESM receiver and transmission of signals by a TDMA data link, for use in some embodiments of the invention. The process begins at step 300, where a dwell to be executed by the receiver may be "obtained" (e.g., extracted from a sequence buffer). The process continues to step 302, where an arbitration process may determine whether the dwell is an acquisition dwell. An acquisition dwell is a dwell which is executed to detect emitted signals. By contrast, non-acquisition dwells are dwells such as time analysis dwells, built-in-test (BIT) dwells, calibration dwells, as well as dwells of other types. Non-acquisition dwells may be, for example, pulse modulation analysis (PMA) dwells, scan type discrimination (STD) dwells, and scan modulation analysis (SMA) dwells. Analysis dwells may be executed at distinct points at time and may therefore be separated by rigid intervals. Acquisition dwells are not executed at a specified hard time, but rather may be executed whenever the receiver is available to execute them.

If, in step 302, it is determined that the current dwell is not an acquisition dwell, the process continues to step 304 where that dwell may be executed. In embodiments of the invention, executing a dwell means configuring receiver 102 to detect emitted signals within a certain frequency range. Non-acquisition dwells either are not disrupted by data link transmission or take precedence over the data link transmission. Thus, in some embodiments non-acquisition dwells only be executed irrespective of the operation of any transmitters. Alternatively, if in step 302 it is determined that the dwell is an acquisition dwell, the process continues to step 306 which may determine whether a dwell delay queue (or a delay queue) is empty. The delay queue is used to store dwells that detect emitted signals in a frequency range that is in conflict with the frequency range of the data link transmission for later execution. The delay queue may be any suitable data structure to store information pertaining to dwells that have been delayed for execution. For each dwell, a time when the dwell was stored in the delay queue may be recorded. In some embodiments, a dwell may be delayed in the delay queue for a finite predetermined amount of time. In some embodiments, the delay queue may have a limit on the number of dwells that may be stored in the delay queue at one time.

If the delay queue is empty, the process continues to step 316 where it is determined whether data link transmission interferes with the scheduled acquisition dwell. The interference, or a conflict, may occur if emitter signals intercepted by the acquisition dwell and the data link transmission both flow through a common component of a receiver (e.g., receiver 102), such as, for example, an amplifier or a switch, with neither the emitter signals nor the data link transmission being filtered out. For example, the data link transmission at a frequency denoted as Fd may saturate an amplifier, and the emitter signals at a frequency denoted as Fs may pass through the same amplifier, thus generating spurious signals at frequencies Fs±Fd, Fs±2Fd, 2Fs±Fd, and other frequencies for all integer multiples. These spurious signals may overload the receiver. Furthermore, emitter signal parameter measurements will be affected by such saturation. For example, emitter amplitude, phase and other parameter measurements may be inaccurate. In some embodiments, such interference can occur over wide frequency ranges, such as, for example, from 800 MHz and/or greater below the data link transmission and 1100 MHz and/or greater above the data link transmission, depending on the receiver design. Thus, for example, one embodiment in which the data link transmits at 1000 MHz, if a dwell is configured to detect emitter signals in a frequency range that differs from a frequency range of the data link transmission by 800 MHz-2200 MHz, the data link transmission may interfere with the execution of the dwell.

If, at step 316, it is determined that data link transmission interferes with the scheduled acquisition dwell, the process continues to step 318, where the acquisition dwell may be placed in the delay queue, and the process may continue to step 300 where a next dwell may be obtained for execution. In some embodiments, a dwell may be executed irrespective of whether a data link transmission interferes with it, and the data link transmission may be suppressed. If it is determined, in step 306, that the delay queue is not empty, the process continues to step 308 where it may be determined whether the delay queue is full.

If the delay queue is not full (i.e., a limit on the number of dwells stored in the delay queue has not been reached), in step 310 it may be determined whether a run count is greater than one. The run count of the delay queue is the number of dwells in the delay queue which, if executed, would not be disrupted by the data link transmission. For example, in some embodiments, such dwells may be dwells which are used to detect signals in frequency ranges that differ from the frequency range of the data link transmission by 800 MHz-2200 MHz. If the run count is greater than one, the process continues to step 312, where a dwell may be selected from the delay queue for execution. To select a dwell to be executed from the delay queue, any suitable criterion or criteria may be used. For example, in some embodiments, dwells in the delay queue may be analyzed in the order that they were enqueued (i.e., placed in the delay queue) and marked as "must run" or "can run." A dwell in the delay queue may be marked as "must run" if it has been in the delay queue for an amount of time that is equal to a predetermined limit on the amount of time the dwell can spend in the queue (which may be a configurable parameter in some embodiments). A "can run" dwell may be a dwell which has been in the delay queue for an amount of time less than the predetermined limit on the amount of time the dwell can spend in the queue and may detect emitted signals within a frequency range that does not conflict with a frequency range of the data link transmission. In some embodiments of the invention, executing a "must run" dwell should be prioritized over executing "can run" dwells. If a choice needs to be made among two or more "can run" dwells, a "can run" dwell which has been in the delay queue for the longest amount of time may be given a priority. It should be appreciated that a dwell to be executed may be selected from the delay queue based on any suitable criteria or in any suitable way, as the invention is not limited in this respect.

Once a dwell is selected for execution, the process continues to step 304, where the dwell is executed. If at step 310 it is determined that the run count is less than or equal to one, which means either that there is only one dwell in the delay queue or only one dwell in the delay queue is suitable for execution, the process continues to step 314, where it may be determined whether the run count is equal to one (i.e., whether the data link transmission does not interfere with one dwell in the delay queue, which may indicate that the delay queue contains one dwell that can or must run). If the run count is equal to one, the process may continue to step 304, where the dwell may be executed. If the run count is not equal to one, the process continues to step 316, where it is determined whether the data link transmission interferes with the dwell scheduled for execution. A scheduled dwell which has not been placed in the delay queue may be checked to determine whether its execution may interfere with data link transmission. If the data link transmission interferes with the dwell, the dwell may be delayed by placing it in the delay queue. Otherwise, if it is determined at step 316 that the data link transmission does not interfere with the dwell, the process continues to step 304 where the dwell may be executed.

If it is determined, in step 308, that the delay queue is full, the process continues to step 320 in FIG. 3B, where an oldest dwell (e.g., the dwell that has been in the delay queue the longest may be selected from the delay queue. The process then continues to step 322, where it is determined whether the data link transmission interferes with the selected dwell. If the data link transmission does not interfere with the selected dwell, the process continues to step 324, where the selected dwell may be executed. However, if it is determined that the data link transmission interferes with the oldest dwell in the delay queue, the process may continue to step 326, where the data link transmission may be suppressed and the selected dwell from the delay queue may then be executed (step 324). Upon executing the selected dwell, the process continues to step 300.

Figure 4:
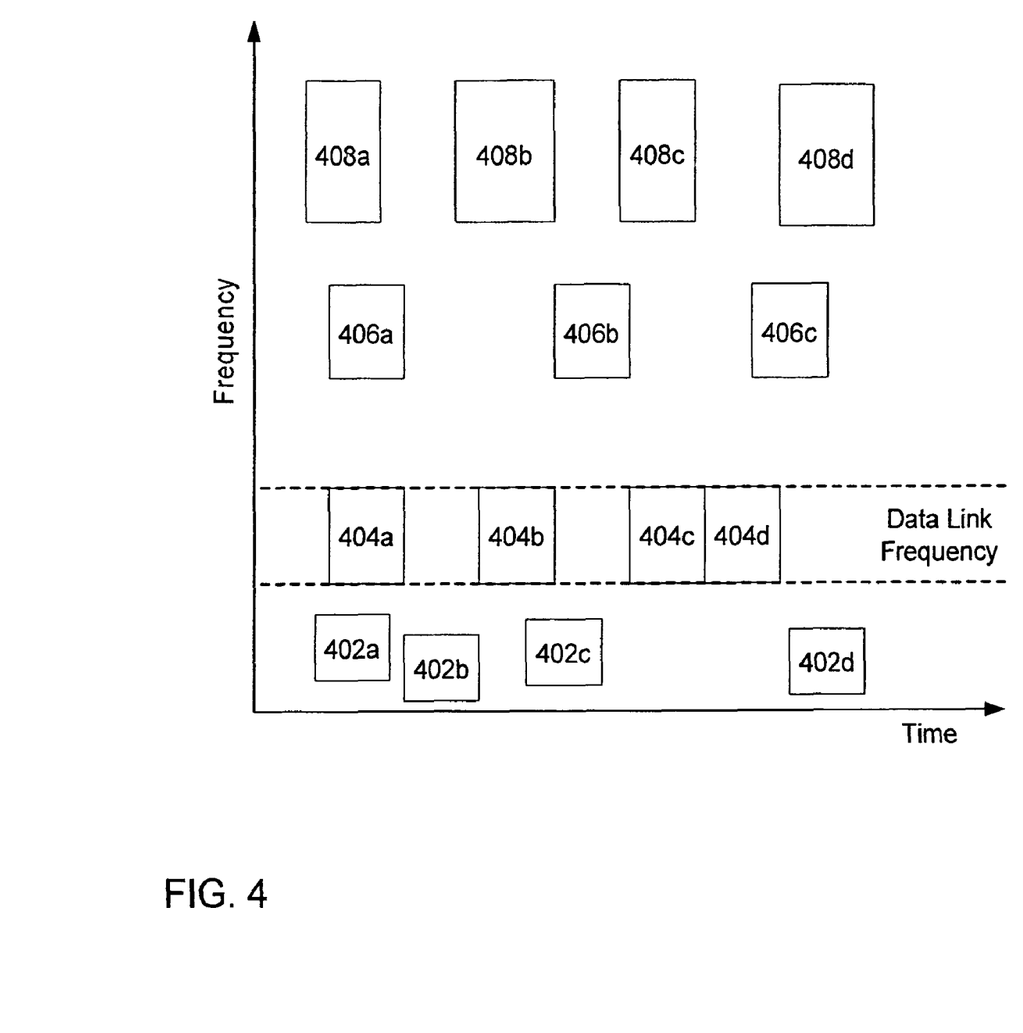
FIG. 4 is a schematic diagram illustrating an example of data link transmission frequency ranges and receiver dwell frequency ranges, in accordance with some embodiments.

As discussed above, an acquisition dwell may be executed if the data link transmission does not interfere with its execution. FIG. 4 illustrates the data link transmission, which occurs, in a given platform, within a particular frequency range, and acquisition dwells, which may detect signals at different frequency ranges and, at some ranges, may interfere with the data link transmission. Thus, blocks 404*a*-404*d* illustrate data link transmit times, while blocks 402*a*-402*d*, 406*a*-406*c*, and 408*a*-408*d* illustrate acquisition dwells, of which acquisition dwells 402*a*-402*d* may detect emitted signals within frequency ranges that are in proximity to a frequency range of transmit slots 404*a*-404*d*. The data link transmission may therefore interfere with acquisition dwells 402*a*-402*d* which, in some embodiments, may not be executed when the data link transmits and may be placed in the delay queue.

Figure 5:
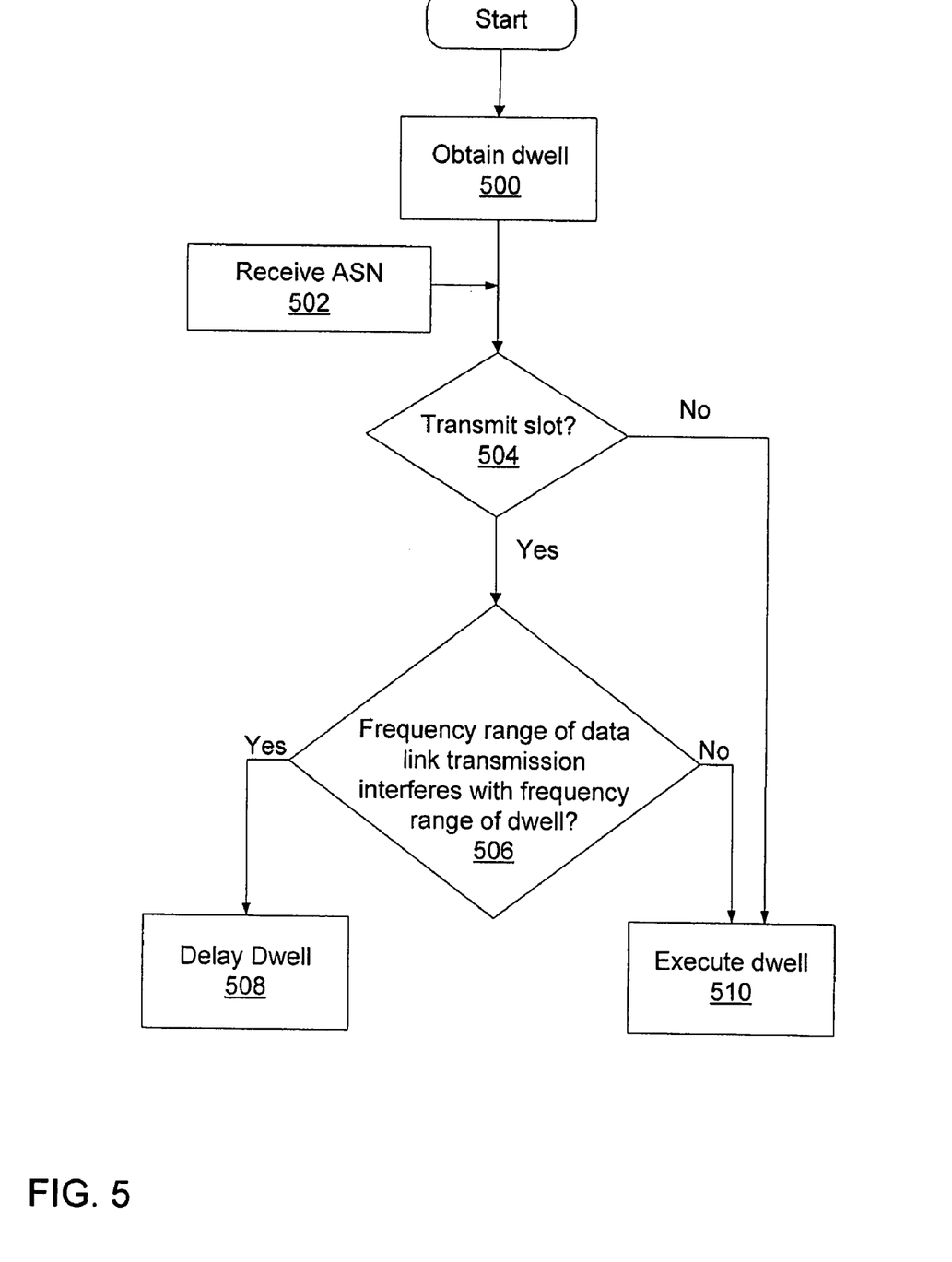
FIG. 5 is a flowchart illustrating a process of determining whether execution of a dwell may interfere with a data link transmission, in accordance with some embodiments.

It may be determined whether a data link transmission interferes with dwell execution in any suitable way, as the invention is not limited in this respect. FIG. 5 is a flowchart illustrating an example of how this determination may be made in some embodiments. The process begins at step 500 by obtaining a dwell (e.g., a dwell contained in the sequence buffer or a dwell from the delay queue). The process then continues to step 502, where an ASN signal is received. The ASN signal indicates that the data link is scheduled to transmit at a future time. The process then continues to step 504, where it is determined if the data link transmits during execution of the dwell (i.e., whether the current slot is a transmit slot). If the data link transmits during execution of the dwell, the process continues to step 506, where it is determined if a frequency range of the data link transmission interferes with the frequency range of the dwell. If there is no interference, the process continues to step 510, where the dwell is executed. If it is determined in step 506 that the data link transmission interferes with the frequency range of the dwell, the dwell may be delayed in any suitable way, for example, by being placed in the delay queue.

Figure 6:
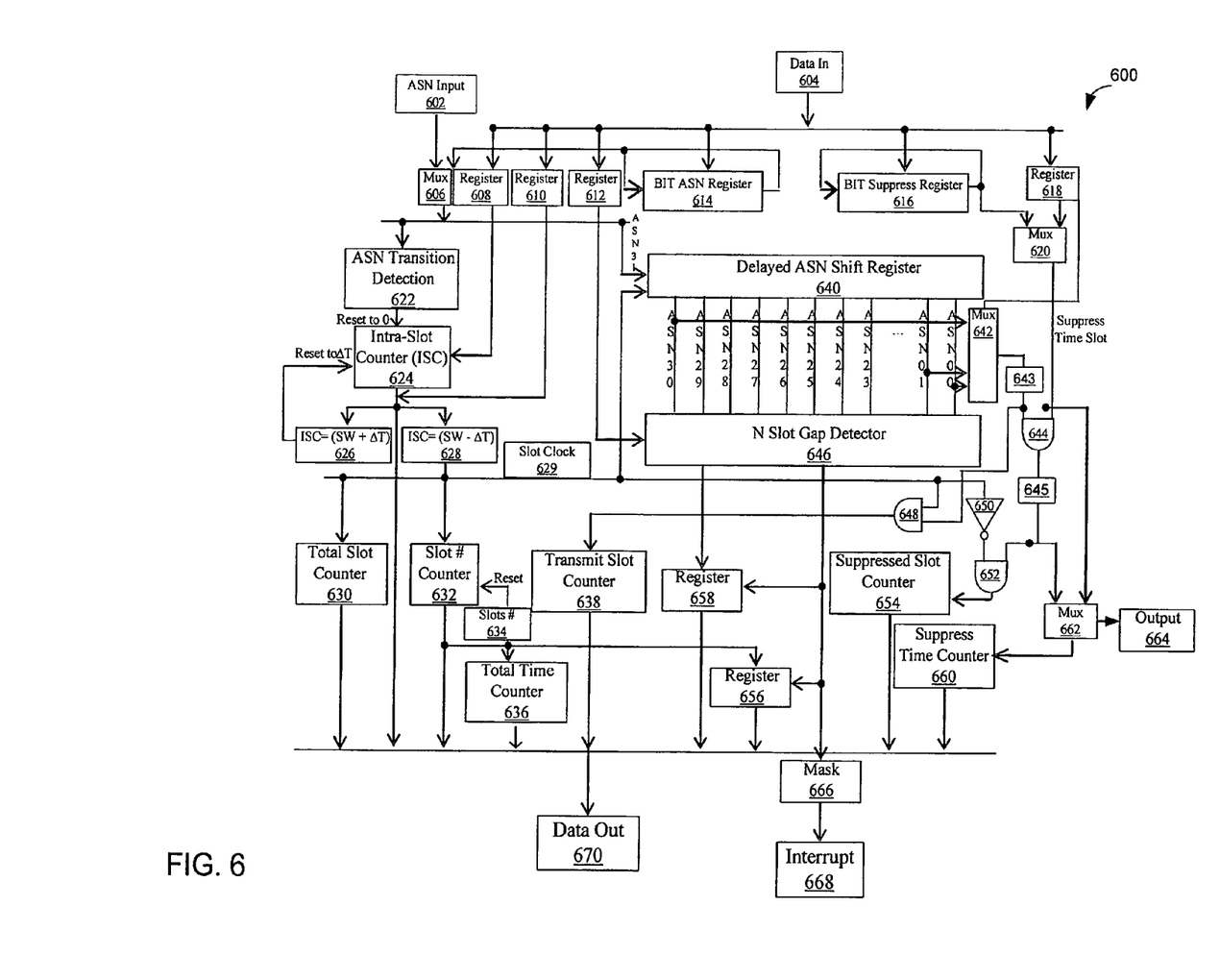
FIG. 6 is an illustrative logic diagram illustrating for determining a scheduled transmit-line of a transmitter, in accordance with some embodiments.

As discussed above in connection with FIGS. 2A and 2B, some embodiments of the invention may be implemented using system 208 including FPGA 210 and OFP 212. However, the invention is not limited in this respect, as any suitable implementation may be used. FIG. 6 is a programming logic diagram illustrating an example implementation of FPGA 210. However, the logic illustrated in FIG. 6 need not be implemented as an FPGA, as any suitable implementation may be used. For example, system 600 may be implemented in software, hardware, or any suitable combination thereof. OFP 212, which may also be included in system 208, may control operation FPGA 210.

System 600 may receive an Advance Slot Notification (ASN) input 602. In some embodiments where the data link is a TDMA data link, the data link may provide the ASN signal at or near a slot boundary. For example, ASN input 602 is located in time relative to data link slots. ASN input 602 and the data link may be synchronized such that transition of the ASN signals occurs within ±2 µs of an actual slot boundary. In some embodiments, data link slots may be 7.8125 ms in duration, however, the invention is not limited in this respect, as any suitable slot duration may be used. Another input provided to system 600 is an input 604, which may be a collection of signals provided to registers 608, 610, 612, 614, 616, and 618, as described below in greater detail.

A transition detector 622 may detect when an ASN transition occurs, i.e., when the ASN signal transitions from a low state to a high state or vice versa. An intra-slot counter 624 tracks slot boundaries. For example, intra-slot counter 624 may be incremented at a predetermined frequency and contains a number of bits (e.g., 19) sufficient to represent a sum of $\Delta T$ and SW, wherein $\Delta T$ is a time increment and SW is a slot width represented in time units. The SW may be set by a register 610 which may be, for example, a 19-bit register. The $\Delta T$ may be set by a register 608 which may be, for example, an 8-bit register, and corresponds to a deviation of the ASN transitions relative to the actual slot boundary. In one embodiment of the invention, $\Delta T$ may vary from 2 µs to 10.2 µs. It should be appreciated however that other suitable values of $\Delta T$ may be used, as the invention is not limited in this respect. Both registers 608 and 610 may be loaded by SBC 208 or in any other suitable way.

Intra-slot counter 624 may be reset to zero by SBC 208 whenever an ASN transition occurs. Alternatively, intra-slot counter 624 may be reset to $\Delta T$ if it reaches (SW+$\Delta T$), which may indicate that intra-slot time counter 624 has failed to recognize a transition to a new transmit slot because an immediately preceding slot had the same state as the current slot.

A slot clock 629 may pulse at the end of every ASN slot, whether the ASN slot is active (i.e., a transmit slot) or not. The period of slot clock 619 may be the SW and may be generated when an intra-slot time (recorded by intra-slot counter 624) equals SW-$\Delta T$. Thus, the slot clock pulses on each slot boundary.

System 600 may provide a slot number counter 632 which may be reset to zero upon initialization or when it becomes equal to its predetermined number of states (block 634). In one embodiment, the number of states may be 98,304. A total slot counter 630 coupled to slot clock 629 and slot number counter 632 may also be provided and may be reset to zero upon initialization or at any other suitable time, such as, for example, when instructed by SBC 208. Total slot counter 630 may be incremented by slot clock 629.

A delayed ASN shift register 640 may provide a notification M slots in advance whether a slot is a transmit slot. M may be any suitable number, such as, for example, eight. ASN shift register 640 may generate 32 delayed ASN slots, with ASN slot 31 having zero delay and ASN slot 00 having 31-slots delay. Transitions of the delayed ASN slots may be aligned with those of ASN input 602 to within ±$\Delta T$. A delayed ASN output 643 may be generated by clocking ASN input 602 into delayed ASN shift register 640 clocked by slot clock 629. A multiplexer 642 may take inputs (32, in some embodiments of the invention) of delayed ASN shift register 640 and select one that corresponds to the current time. The state of multiplexer 624 at its output may indicate whether the data link will transmit during the current time.

Delayed ASN output 643 may provide the ASN delayed M slots to real-time, where M may be provided by a register 618 loaded by SBC 208. In some embodiments, M may be equal to eight, i.e., delayed ASN output 643 may indicate eight slots in advance whether a slot will be a transmit slot. However, the invention is not limited in this respect, as any other suitable number of slots may be used.

In some situations, such as, for example, when the delay queue is full or if a dwell has been in the delay queue for duration of time equal to a predetermined limit on the amount of time the dwell can spend in the queue, the data link transmission may be suppressed. Accordingly, system 600 may provide a data link suppress transmission signal 645. For example, a value of the data link suppress transmission signal 645 may be set high if the data link transmission is to be suppressed and low otherwise, or set in any other suitable way. To produce signal 645, register 618 may receive a suppress transmit signal that may be set high if the data link transmission is to be suppressed and low otherwise. An output of register 618 may be provided to a multiplexer 620. A logical AND gate 644 may then combine an output of multiplexer 620 with the delayed ASN output 643 to provide data link suppress transmission signal 645. Gate 644 may provide data link suppress transmission discrete 645 only if a slot to be suppressed is active. Therefore, only if multiplexer 642 provides an output indicative of an active slot, may gate 644 produce data link suppress transmission signal 645.

System 600 may include a suppressed transmit slot counter 654 that may be reset to zero upon initialization or in any other suitable way, such as, for example, when instructed by SBC 208. Suppressed transmit slot counter 654 may be incremented by a logical AND of data link suppress transmission signal 645 and an inverted slot clock 629 (e.g., using an inverter 650), using an AND gate 652, in such a way that it is incremented if any part of a slot is suppressed. Thus, suppressed transmit slot counter 654 may be incremented each time a slot is suppressed.

If an analysis dwell (e.g., a PMA dwell, an STD dwell, or an SMA dwell) is executed, suppressed transmit slot counter 654 and total slot counter 630 may be used to compute a data link suppression duty cycle, which is performed by dividing a value of suppressed transmit slot counter 654 by a value of total slot counter 630 and multiplying the result by 100. A thus obtained value may be rounded to a nearest integer. The data link suppression duty cycle indicates a percent of time that the data link suppress transmission is active and may be used to determine whether a performance of the data link is being adversely affected. This provides an indication of how efficiently the data link operates, given that its transmission may be suppressed.

In some embodiments, system 600 may include BIT registers (e.g., BIT ASN shift register 614 and BIT suppress shift register 616), which may be used to simulate functionality provided by system 600 during its operation (e.g., may provide a BIT mode). BIT suppress register 616 may be used to simulate suppression of a data link transmission when a serial output of BIT suppress shift register 616 is connected in place of the suppress transmit input of register 618 (e.g., using multiplexer 610). BIT ASN shift register 614 may provide the BIT mode when a serial output of BIT ASN shift register 614 is connected in place of the ASN input 606 (e.g., using a multiplexer 606). During the BIT mode, BIT shift registers 614 and 616 may shift circularly when intra-slot counter 624 equals to slot width SW. In some embodiments, BIT shift registers 614 and 616 do not shift when the BIT mode is not active.

In addition to suppressed transmit slot counter 654, system 600 may include a suppress time counter 660 which may be reset to zero upon initialization or in any other suitable way, such as, for example, when instructed by system 208. A multiplexer 662 may receive, at its first input, an output of register 618 and, at its second input, data link suppress transmission signal 645, and output a multiplexed signal which may then be provided to suppress time counter 660. A first output 664 of multiplexer 660 may be provided to the data link to suppress transmission. A second output of multiplexer 660 may be provided to suppress time counter 660 that may be incremented when a selected input of multiplexer 660 receives high value. System 600 may provide a total time counter 636 that may be reset to zero upon initialization or in any other suitable way, such as, for example, when instructed by system 208. Similarly to suppressed transmit slot counter 654, suppress time counter 660, together with total time counter 636, may be used to compute the data link suppression duty cycle. To compute the data link suppression duty cycle, a value of suppress time counter 660 may be divided by a value of total time counter 636, a result of which may be multiplied by 100. A thus obtained value may be rounded to a nearest integer. The data link suppression duty cycle may indicate a percent of time that the data link suppress transmission is active and may be used to determine whether a performance of the data link is being adversely affected. The duty cycle may be utilized to configure parameters used by system 600. For example, if the duty cycle is high, the predetermined size of the delay queue and/or the predetermined amount of time a dwell can spend in the delay queue may be decreased to allow for more frequent execution of dwells. If the duty cycle is low, the predetermined size of the delay queue and/or the predetermined amount of time a dwell can spend in the delay queue may be increased, because the data link transmits a small portion of its operating time.

In addition to the counters described above, system 600 may include a transmit slot counter 638 which may be driven by a logical AND gate 648. First and second inputs of gate 648 may be the output of multiplexer 642 and slot clock signal 629, respectively. Transmit slot counter 638 may keep track of a number of past slots that were transmit slots.

During data link operation, an interrupt in the signal transmission may be desired to perform some additional processing. Accordingly, a certain number of slots may be masked off, so that the data link does not transmit during these slots, to produce the interrupt in data link transmission. To implement the interrupt, an N slot gap detector 646 may be used to generate an N-slot gap interrupt when a gap (i.e., a number of consecutive slots that are not transmit slots) of N slots or greater is detected. For example, N may range from 0 to 32. A value of zero means that no interrupt is to be generated, and values of 1 to 32 represent gap widths of 1 to 32 slots. The interrupt may occur early in the first slot of the gap, at an intra-slot time of $\Delta T$. Register 612 may supply N, the number of consecutive inactive slots, to N slot gap detector 646. It should be noted that, in some embodiments, N may not be greater than M+1, where M is the number of slots in advance of which the ASN signal transitions, as described above.

When the interrupt is generated, a current value of slot number counter 632 may be stored in an interrupt slot number register 656. This information may be used to time dwells that may occur during gaps in the data link transmission. A value of interrupt slot number register 656 may be updated upon interrupt whether masked or not. A mask 666 may receive a signal to mask off ASN transmit slots and may provide a signal to an interrupt block 668.

When the N-slot gap warning interrupt is generated, system 600 may determine the width of the gap, which may be stored in a slots-to-end-of-gaps register 658. When the interrupt first occurs, this value will be N, but it increases if additional sequential non-transmit slots occur. A value of slots-to-end-of-gaps register 658 may be updated upon interrupt whether masked or not.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, flash memories, circuit configurations in Field Programmable Gate Arrays or other semiconductor devices, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method for coordinating detection of emitted signals with transmission of signals in a platform having at least one transmitter that transmits signals in a first frequency range and at least one receiver system adapted to perform a previously computed scan strategy comprising a set of a plurality of dwells, the method comprising acts of:
    modifying the previously computed scan strategy during performance, by the at least one receiver system, of at least a portion of the previously computed scan strategy by:
        determining a first time at which at least one signal in the first frequency range is scheduled for transmission by the at least one transmitter;
        identifying, in the previously computed scan strategy, a first dwell from the plurality of dwells that is scheduled to be executed during the first time;
        determining whether a frequency range of the first dwell of the previously computed scan strategy conflicts with the first frequency range; and
        in response to determining that the frequency range of the first dwell of the previously computed scan strategy conflicts with the first frequency range, delaying execution of the first dwell for execution at a later time, wherein the act of delaying execution of the first dwell further comprises placing the first dwell in a delay queue.

2. The method of claim 1, wherein the delay queue imposes a limit on an amount of time that the first dwell can remain in the delay queue.

3. The method of claim 1, wherein the method further comprises acts of:
    determining that the delay queue is full; and
    in response to determining that the delay queue is full, selecting a dwell in the delay queue for execution based on an amount of time the dwell has been in the delay queue.

4. The method of claim 1, wherein the act of determining the first time at which the at least one signal in the first frequency range is scheduled for transmission further comprises receiving a notification from the transmitter indicating a time at which the transmitter is scheduled to transmit.

5. The method of claim 4, wherein the notification is received in advance of the scheduled transmission.

6. The method of claim 1, wherein the transmitter communicates according to a time division multiple access (TDMA) protocol.

7. At least one computer storage device that stores instructions that, when executed, perform a method for coordinating detection of emitted signals with transmission of signals in a platform having at least one transmitter that transmits signals in a first frequency range and at least one receiver system adapted to perform a previously computed scan strategy comprising a set of a plurality of dwells, the method comprising acts of:
    modifying the previously computed scan strategy during performance, by the at least one receiver system, of at least a portion of the previously computed scan strategy by:
        determining a first time at which at least one signal in the first frequency range is scheduled for transmission by the at least one transmitter;
        identifying, in the previously computed scan strategy, a first dwell from the plurality of dwells that is scheduled to be executed during the first time;
        determining whether a frequency range of the first dwell of the previously computed scan strategy conflicts with the first frequency range; and
        in response to determining that the frequency range of the first dwell of the previously computed scan strategy conflicts with the first frequency range, delaying execution of the first dwell for execution at a later time, wherein the act of delaying execution of the first dwell further comprises placing the first dwell in a delay queue.

8. The at least one computer storage device of claim 7, wherein the delay queue imposes a limit on an amount of time that the first dwell can remain in the delay queue.

9. The at least one computer storage device of claim 7, wherein the method further comprises acts of:
    determining that the delay queue is full; and in response to determining that the delay queue is full, selecting a dwell in the delay queue for execution based on an amount of time the dwell has been in the delay queue.

10. The at least one computer storage device of claim 7, wherein the act of determining the first time at which the at least one signal in the first frequency range is scheduled for transmission further comprises receiving a notification from the transmitter indicating a time at which the transmitter is scheduled to transmit.

11. The at least one computer storage device of claim 10, wherein the notification is received in advance of the scheduled transmission.

12. The at least one computer storage device of claim 7, wherein the transmitter communicates according to a time division multiple access (TDMA) protocol.

13. At least one receiver system adapted to perform previously computed scan strategy comprising a set of a plurality of dwells and configurable to operate with at least one transmitter that transmits signals in a first frequency range, the at least one receiver system comprising:
- at least one controller that modifies the previously computed scan strategy during performance, by the at least one receiver system, of at least a portion of the previously computed scan strategy by:
  - determining a first time at which at least one signal in the first frequency range is scheduled for transmission by the at least one transmitter;
  - identifying, in the previously computed scan strategy, a first dwell from the plurality of dwells that is scheduled to be executed during the first time;
  - determining whether a frequency range of the first dwell of the previously computed scan strategy conflicts with the first frequency range; and
  - in response to determining that the frequency range of the first dwell of the previously computed scan strategy conflicts with the first frequency range, delaying execution of the first dwell for execution at a later time, wherein the at least one controller places the first dwell in a delay queue in response to determining that the frequency range of the first dwell conflicts with the first frequency range.

14. The at least one receiver system of claim 13, wherein the delay queue imposes a limit on an amount of time that the first dwell can remain in the deley queue.

15. The at least one receiver system of claim 13, wherein the at least one controller:
- determines that the delay queue is full; and
- in response to determining that the delay queue is full, selects a dwell in the delay queue for execution based on an amount of time the dwell has been in the delay queue.

16. The at least one receiver system of claim 12, wherein the at least one controller: receives a notification from the transmitter indicating a time at which the transmitter is scheduled to transmit.

17. The at least one receiver system of claim 16, wherein the notification is received in advance of the scheduled transmission.

18. A method for coordinating detection of emitted signals with transmission of signals in a platform having at least one transmitter that transmits signals in a first frequency range and at least one receiver system adapted to perform a previously computed scan strategy comprising a plurality of dwells, the method comprising acts of:
- modifying the previously computed scan strategy during performance, by the at least one receiver system, of at least a portion of the previously computed scan strategy by:
  - determining a first time at which at least one signal in the first frequency range is scheduled for transmission by the at least one transmitter;
  - selecting, in the previously computed scan strategy, a first dwell from the plurality of dwells to be executed at the first time;
  - determining whether a frequency range of the first dwell of the previously computed scan strategy conflicts with the first frequency range;
  - when it is determined that the frequency range of the first dwell of the previously computed scan strategy conflicts with the first frequency range, delaying execution of the first dwell, wherein the act of delaying execution of the first dwell further comprises placing the first dwell in a delay queue;
  - determining that the delay queue is full; and
  - in response to determining that the delay queue is full, selecting a dwell in the delay queue for execution based on an amount of time the dwell has been in the delay queue.

* * * * *

UNITED STATES PATENT AND TRADEMARK OFFICE
CERTIFICATE OF CORRECTION

| | | |
|---|---|---|
| PATENT NO. | : 8,170,135 B2 | Page 1 of 1 |
| APPLICATION NO. | : 11/714717 | |
| DATED | : May 1, 2012 | |
| INVENTOR(S) | : Craig A. Hanna et al. | |

It is certified that error appears in the above-identified patent and that said Letters Patent is hereby corrected as shown below:

Column 12, claim 1, line 8 should read: --time, wherein the act of delaying the execution of the first--.

Column 12, claim 7, line 59 should read: --time, wherein the act of delaying the execution of the first--.

Column 13, claim 13, line 17 should read: --At least one receiver system adapted to perform a previ--.

Column 13, claim 14, line 45 should read: --first dwell can remain in the delay queue--.

Signed and Sealed this
Tenth Day of July, 2012

David J. Kappos
*Director of the United States Patent and Trademark Office*